Feb. 17, 1970  C. V. LOWETH ETAL  3,495,420
TWO STAGE GENERATOR ABSORPTION UNIT WITH
CONDENSATE HEAT EXCHANGER
Filed Dec. 20, 1968
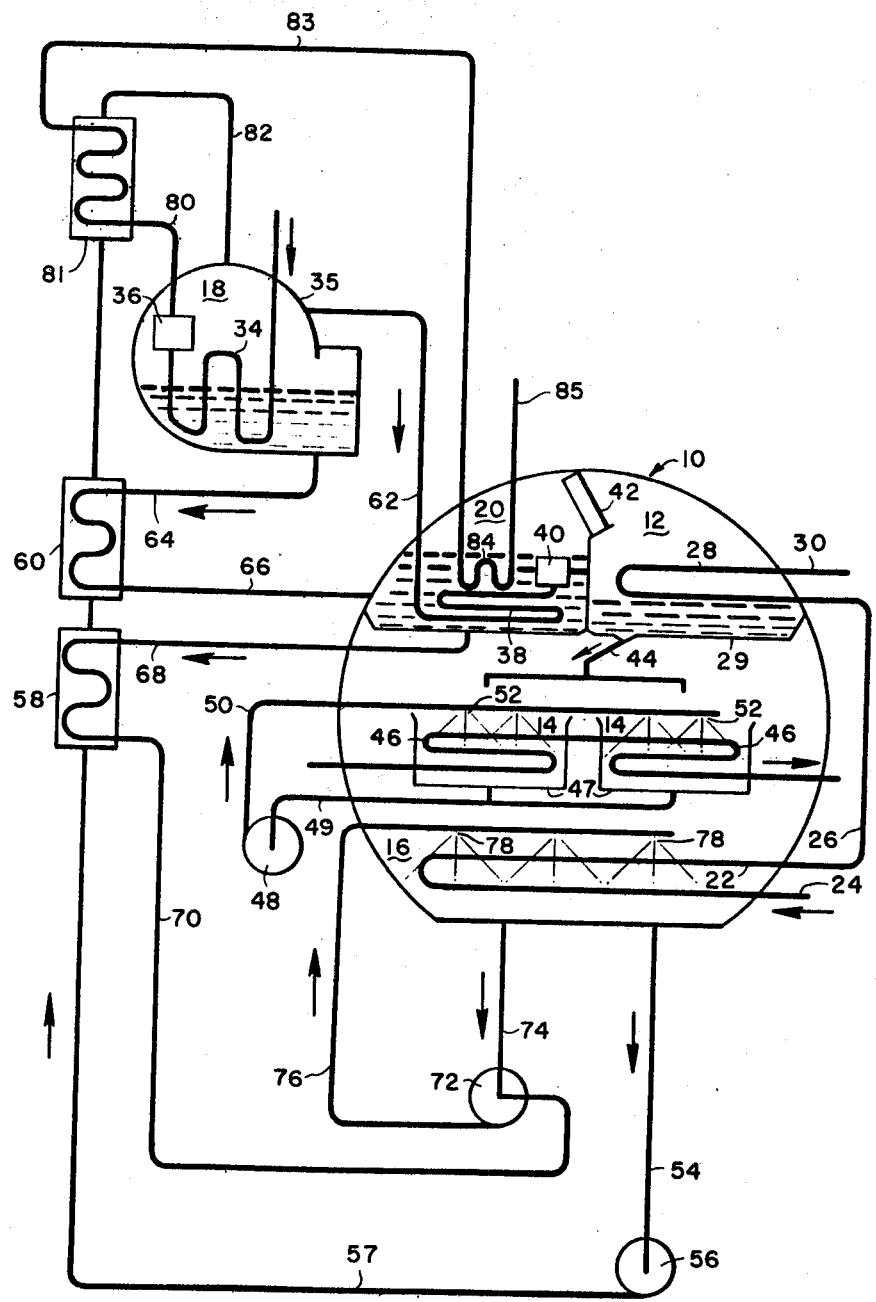
INVENTORS
CARL V. LOWETH
JAMES M. PORTER
BY
ATTORNEY United States Patent Office 3,495,420
Patented Feb. 17, 1970

3,495,420
TWO STAGE GENERATOR ABSORPTION UNIT WITH CONDENSATE HEAT EXCHANGER
Carl V. Loweth, Onalaska, and James M. Porter, La Crosse, Wis., assignors to The Trane Company, La Crosse, Wis., a corporation of Wisconsin
Filed Dec. 20, 1968, Ser. No. 785,509
Int. Cl. F25b 15/00
U.S. Cl. 62—476                    5 Claims

ABSTRACT OF THE DISCLOSURE

An absorption refrigeration machine containing a two stage generator effectively utilizes heat from a first stage generator high pressure steam condensate to preheat the weak absorption solution entering the first stage generator alone or in conjunction with a second heat exchanger located in a second stage low pressure generator.

BACKGROUND OF THE INVENTION

Field of the invention

This invention relates to an absorption refrigeration machine, and more particularly to a two stage absorption refrigeration machine which employs condensate heat exchangers. The machine of this invention is more efficient in the utilization of heat input than prior machines.

Discussion of the prior art

It is always desirable to increase the efficiency of an absorption refrigeration machine, thus making a more compact physical structure and also decreasing operating costs. Modifications of absorption machines have been made toward this end, including the addition of refrigerant economizers and multiplication of stages in a given operation within the absorption cycle. Heretofore, condensate from high pressure steam supplied to the generator has been returned to the steam source or has been used to heat intermediate strength solution leaving the first stage generator. The heat from the high pressure steam condensate is more effectively utilized than it has been in prior applications without destroying the equilibrium of the absorption cycle.

SUMMARY OF THE INVENTION

This invention provides an absorption refrigeration machine including an absorber, an evaporator, a condenser, and a chilled medium heat exchanger in heat transfer relationship with the evaporator. The improvement in this refrigeration machine comprises: a high pressure generator having located therein a second heat exchanger which has an inlet and an outlet, the second heat exchanger inlet adapted to be connected to a source of steam, restrictor means connected to the second heat exchanger outlet to restrict the flow of condensate from the second heat exchanger, a low pressure generator, first liquid passage means for conducting intermediate strength absorbent solution from the high pressure generator to the low pressure generator, second liquid passage means for conducting weak absorbent solution from the absorber to the high pressure generator. A third heat exchanger located in the second liquid passage means, the heat exchanger having an inlet and an outlet, the third heat exchanger inlet in liquid communication with the restrictor means, the third heat exchanger outlet adapted to return condensate to the source of steam, vapor passage means for conducting refrigerant vapor from the high pressure generator to the low pressure generator, the vapor pasage means in heat exchange relationship with the low pressure generator. In addition, this invention can be utilized in conjunction with a fourth heat exchanger which has an inlet and an outlet, the fourth heat exchanger inlet connected in liquid communication with the third heat exchanger outlet, and the fourth heat exchanger outlet adapted to return condensate to the source of steam.

BRIEF DESCRIPTION OF THE DRAWINGS

The figure is a schematic illustration of a two shell, two-stage absorption refrigeration machine which includes the concept of this invention.

DESCRIPTION OF THE PREFERRED EMBODIMENTS

The figure schematically illustrates an absorption refrigeration machine comprising a fluid tight shell 10 enclosing a condenser 12, a two section evaporator 14, an absorber 16, and a second stage generator 20. The first stage generator 18 is enclosed by fluid tight shell 35.

The absorber 16 contains a heat exchanger 22 supplied with cooling fluid from a source 24 to remove heat from the absorber. Source 24 can be water which is evaporatively cooled by air or any other suitable cooling medium. This cooling fluid is conducted by a conduit 26 to a heat exchanger 28 in condenser 12. A wall 29 substantially encloses the condenser section. The cooling fluid leaves the condenser through a conduit 30.

High pressure steam flows from a source 32, such as a boiler, to a heat exchanger 34 in the first stage generator 18. High pressure steam is the preferable fluid heating medium although other suitable heat sources can be used; for example, superheated water or an organic heating fluid such as a chlorinated biphenyl. Heat exchanger 34 terminates in restrictor means 36. Restrictor means 36 can be any suitable steam flow restrictor such as an orifice or a float valve. The restrictor can be located inside or outside of shell 35. Heat from condensing steam in the heat exchanger 34 causes dilute absorbent solution in the first stage generator to boil. The steam condensate flows through trap 36 into conduit 80.

Various types of refrigerants and absorbents may be used in the present machine. A solution of lithium bromide absorbent in a refrigerant such as water is satisfactory. The term "concentrated solution" as used herein means a solution which is concentrated in absorbent. A "weak solution" is a solution dilute in absorbent. A solution having a concentration between that of a weak solution and a concentrated solution is termed an "intermediate strength solution."

The refrigerant vapor generated in the first stage generator 18 flows through conduit 62 into a heat exchanger 38 in the second stage generator 20. A flow regulating device 40, in the form of an orifice or trap, allows only condensed refrigerant to flow from the heat exchanger 38 to the condenser 12. Heat from condensing refrigerant in heat exchanger 38 causes intermediate strength solution in the second stage generator 20 to boil. The refrigerant vapor produced in the second stage generator passes through an eliminator 42 to remove entrained liquid and into the condenser 12. The refrigerant vapor is condensed to a liquid in the condenser. The total condensed liquid refrigerant flows through a conduit 44 to the evaporators 14.

The absorbent solution in the absorber 16 absorbs the refrigerant vapor from the evaporators 14. Fluid from a heat load is chilled in heat exchanger 46 and recirculated to the heat load. Refrigerant liquid dripping from the heat exchanger 46 is collected by pans 47, from which it flows through a conduit 49 to a pump 48 which delivers the refrigerant liquid through conduit 50 to be sprayed in the evaporators 14 through nozzles 52.

Solution from the absorber 16 flows through conduit 54, pump 56, through conduit 57 to low temperature heat exchanger 58, to high temperature heat exchanger 60, and through conduit 62 into heat exchanger 81. From heat exchanger 81 the weak solution flows into conduit 82 and thence into high temperature generator 18 where it is partially concentrated. The heating medium for heat exchanger 81 is high pressure steam condensate or other heating medium which is supplied through conduit 80 from trap 36. After heat is removed from the condensate in heat exchanger 81, it enters conduit 83. Conduit 83 is connected to heat exchanger 84, located within the low pressure generator 20. Additional heat is removed from the condensate in heat exchanger 84 to aid further concentration of intermediate strength absorbent solution in the low pressure generator 20. From heat exchanger 84, the condensate travels through conduit 85 in which it is returned to the source. Alternatively, the high pressure steam condensate can be returned to the steam source directly from conduit 83. In this alternative embodiment heat exchanger 84 and conduit 85 would be omitted from the structure, thus reducing the initial cost of the machine.

The partially concentrated solution flows through conduit 64 from the first stage generator 18 to high temperature heat exchanger 60 and thereafter through conduit 66 to second stage generator 20. Concentrated solution from the second stage generator 20 flows through conduit 68 to low temperature heat exchanger 58 and then through conduit 70 to pump 72. Dilute solution flowing from absorber 16 through conduit 74 to pump 72 is mixed with concentrated solution flowing in conduit 70 to pump 72. The mixed solution flows from pump 72 through conduit 76 and is discharged through nozzles 78 into the absorber 16.

Although control systems are necessary to proper operation of the absorption refrigeration machine disclosed, they are not illustrated nor described. However, an exemplary control system is described in copending application, Ser. No. 785,512, filed Dec. 20, 1968, assigned to the assignee hereof.

The utility of this invention is readily apparent to one skilled in the refrigeration art. Utilization of condensate from the high pressure steam supplied to the first stage generator reduces steam consumption, thus increasing economy of the absorption refrigeration cycle.

Therefore, what is claimed is:

1. An absorption refrigeration machine including an absorber, an evaporator, a condenser, a chilled medium heat exchanger in heat transfer relationship with said evaporator, the improvement therein comprising:
    (a) a high pressure generator having located therein a second heat exchanger which has an inlet and an outlet, said second heat exchanger inlet adapted to be connected to a fluid heat source, restrictor means connected to said second heat exchanger outlet for restricting a flow of fluid from said second heat exchanger,
    (b) a low pressure generator,
    (c) first liquid passage means for conducting intermediate strength absorbent solution from said high pressure generator to said low pressure generator,
    (d) second liquid passage means for conducting weak absorbent solution from said absorber to said high pressure generator,
    (e) a third heat exchanger located in said second liquid passage means, said heat exchanger having an inlet and an outlet, said third heat exchanger inlet in liquid fluid communication with said restrictor means, said third heat exchanger outlet adapted to return cooled fluid to said fluid heat source,
    (f) vapor passage means for conducting refrigerant vapor from said high pressure generator to said low pressure generator, said vapor passage means in heat exchange relationship with said low pressure generator.

2. The absorption refrigeration machine of claim 1 wherein said low pressure generator has located therein a fourth heat exchanger which has an inlet and an outlet, said fourth heat exchanger inlet connected in liquid communication with said third heat exchanger outlet, said fourth heat exchanger outlet adapted to return cooled fluid to said heat source.

3. The absorption refrigeration machine of claims 1 and 2 wherein said vapor passage means comprises a fifth heat exchanger having an outlet, a restrictor means attached to said fifth heat exchanger outlet to restrict the flow of refrigerant condensate from said vapor passage means, said restrictor means also communicating with said condenser to conduct refrigerant condensate to said condenser, said fifth heat exchanger thereby comprising a high pressure refrigerant condenser.

4. The absorption refrigeration machine of claims 1 and 2 wherein said condenser is a low pressure condenser.

5. The absorption refrigeration machine of claims 1 and 2 wherein said fluid heat source is high pressure steam, said steam returned to said heat source as condensate.

References Cited

UNITED STATES PATENTS

| | | | |
|---|---|---|---|
| 2,755,635 | 7/1956 | Bourne | 62—485 |
| 3,266,266 | 8/1966 | Reid | 62—497 |

LLOYD L. KING, Primary Examiner

U.S. Cl. X.R.

62—485, 497